United States Patent [19]

Grasso

[11] Patent Number: 5,469,258
[45] Date of Patent: Nov. 21, 1995

[54] RING LASER GYROSCOPE WITH TILTING MIRRORS

[75] Inventor: Mark S. Grasso, Whippany, N.J.

[73] Assignee: Allied Signal Inc., Morris Township, Morris County, N.J.

[21] Appl. No.: 158,666

[22] Filed: Nov. 29, 1993

[51] Int. Cl.$^6$ .................................................. G01C 19/70
[52] U.S. Cl. ................................................ 356/350; 372/94
[58] Field of Search .......................... 356/350; 372/97, 372/107

[56] References Cited

U.S. PATENT DOCUMENTS 3,612,690 10/1971 Staats .
4,410,274 10/1983 Ljung .
4,410,276 10/1983 Ljung et al. .
4,653,919 3/1987 Stjern et al. .
4,686,683 8/1987 Martin .
4,824,252 4/1989 Lim et al. ............................. 356/350
5,059,028 10/1991 Hill .

FOREIGN PATENT DOCUMENTS 8503568 8/1985 WIPO ................................... 356/350

*Primary Examiner*—Samuel a. Turner

[57] ABSTRACT

A ring laser gyro has tilting mirrors that can be sinusoidally tilted and therefore cause the optical path defined by the mirrors to be sinusoidally rotated (dithered). The dithering of the mirrors takes place in an angular motion. The mirrors are driven by the same drive signal therefore eliminating the need to precisely control the amplitude and phase.

14 Claims, 3 Drawing Sheets

RING LASER GYROSCOPE WITH TILTING MIRRORS

BACKGROUND OF THE INVENTION

1. Field of the Invention

The present invention relates to minimizing the effects of lock-in for an RLG and more particularly to dithering the optical path of the RLG by tilting the mirrors.

2. Description of the Prior Art

A ring laser gyro must overcome the problem of "lock-in" to be a practical device for measuring low rotation rates. One commaon method to minimize the effects of lock-in for an RLG is to mechanically dither the RLG. This is accomplished by using a flexure to sinusoidally rotate (dither) the RLG laser frame assembly with respect to its mounting plate. The sinusoidal motion has a large peak angular velocity but low angular displacement. The time that this input rate is below the lock-in threshold is thereby greatly reduced. The mechanical energy involved with dithering an RLG laser frame assembly presents problems when designing a system with three or more ring laser gyroscopes. Precautions must be made to avoid coupling of mechanical energy to other gyros or to the system.

One possible alternate approach is to dither the mirrors. Several patents (U.S. Pat. Nos. 4,686,683, 4,410,276, 4,410,274, 4,653,919 and 4,592,656) describe the use of mirror actuators that translate the mirror in a linear motion however none of these patents describe the improved performance technique of dithering the mirrors in an angular motion.

SUMMARY OF THE INVENTION

The present invention does not employ the dithering of the RLG mirror(s) in a linear motion as described in the prior art but rather the dithering of the mirrors in an angular motion. The optical path for a resonant RLG is defined by the location and angles of the mirrors. By sinusoidally tilting the mirrors, the optical path can be sinusoidally rotated (dithered), thereby imparting the desired sinusoidal angular rate.

This shows an improvement over the prior art of mechanical dithering the entire RLG by drastically reducing the dithering inertia, increasing the dither frequency, decreasing the dither amplitude and increasing peak angular velocity.

The present invention therefore includes the use of state of the art RLG design with the addition of tilting mirrors. The tilting mirrors are capable of tilting the surface of the mirror. The mirrors are driven by the same drive signal to all mirrors therefore eliminating the need to precisely control the amplitude and phase.

DETAILED DESCRIPTION OF THE INVENTION

Figure 1:
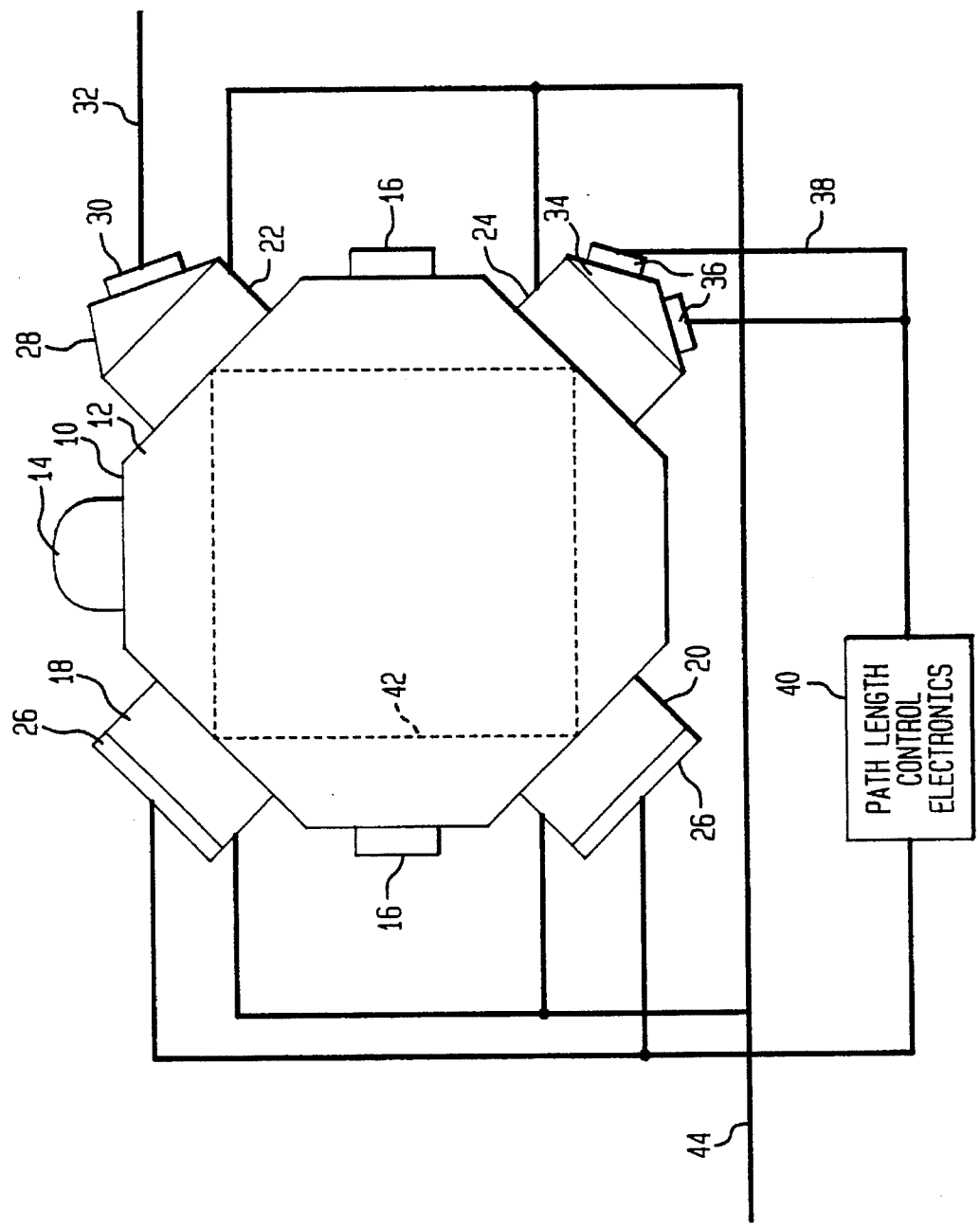
FIG. 1 illustrates an RLG with four tiltable mirrors.

FIG. 1 shows a ring laser gyroscope 10 with frame 12, cathode 14, anodes 16 and four tiltable mirror assemblies 18, 20, 22, 24. Mirrors 18 and 20 have path length control devices 26. Mirror 22 has prism 28 and heterodyne detector 30 with output signals 32. Mirror 24 has detector support structure 34 for intensity detectors 36. The signals 38 and path length control electronics 40 are used to control the path length control devices 26 to maintain a constant length of optical path 42. The four tiltable mirror assemblies are controlled with a sinusoidal drive signal 44.

Figure 2:
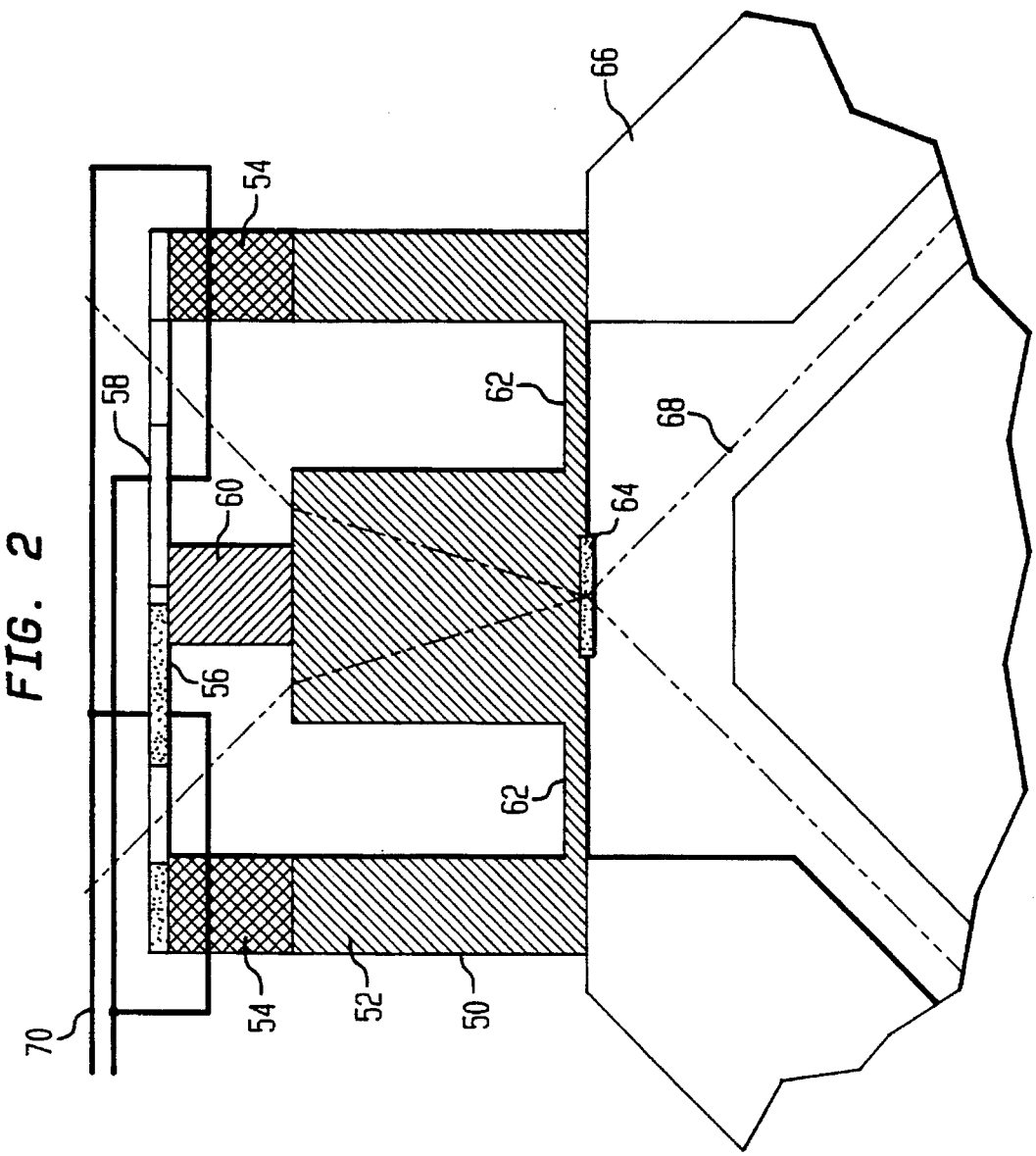
FIG. 2 illustrates one possible configuration that will tilt the surface of a mirror.

FIG. 2 shows the tiltable mirror assembly 50 made up of a moated mirror 52, support structure 54 and drive PZTs 56 and 58. PZTs 56 and 58 are electrically wired such that a voltage on sinusoidal drive signal 70 causes the length of PZT 56 to increase while the length of PZT 58 decreases. This applies a force on center post 60, resulting in a deformation of the thin moated webs 62 and a tilting of the mirror surface and optical coating 64. When this mirror is mounted on frame 66, the optical beam 68 is partially transmitted through the mirror coating 64 and passes through openings in the PZTs 56 and 58.

Figure 3:
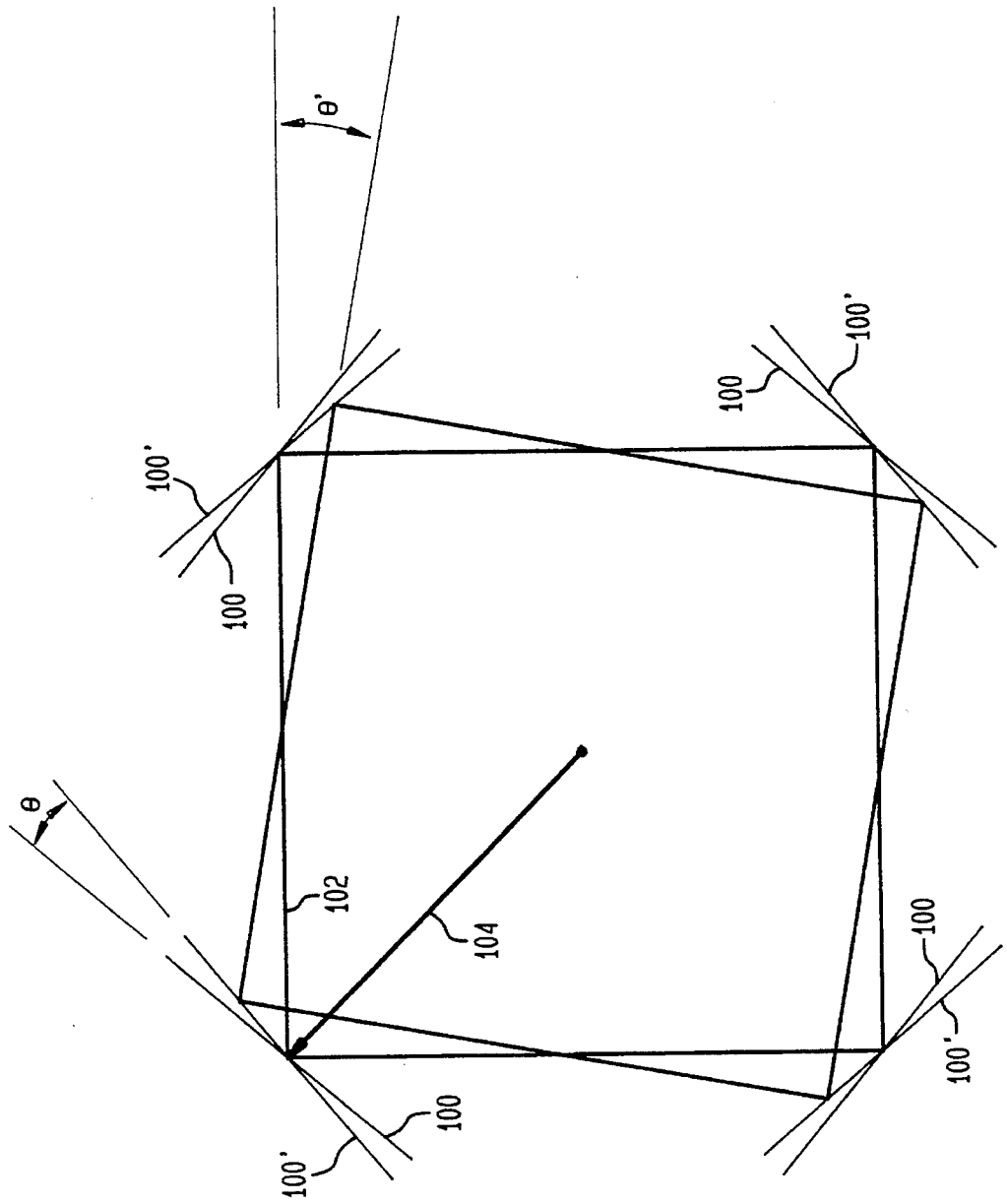
FIG. 3 illustrates all four mirrors tilted by angle θ and the optical path rotated by θ'.

FIG. 3 shows a geometric ray trace of the optical path 102 defined by the four mirrors 100. When the four mirrors are tilted by angle θ to angular position 100', the optical path 102 rotates to optical path 102'. The angle between optical path 102 and 102' is θ' defined by $$\theta' = \theta + \arctan(r^*\sin(\theta)/(R - r^*\cos(\theta)))$$

where r is the radial distance 104 from mirror 100 to the center of the gyro and R is the radius of curvature of mirror 100.

It is not intended that this invention be limited to the hardware or operational procedures shown disclosed. This invention includes all of the alterations and variations thereto as encompassed within the scope of the claims as follows.

I claim:

1. A ring laser gyroscope with tilting mirrors comprising:

a frame;

cathode and anode means mounted on said frame for producing two counterpropagating waves traveling in opposite directions about an optical path within said frame;

four tiltable mirror assemblies mounted on said frame for defining said optical path;

path length control electronic means for maintaining a constant length of said optical path; and, sinusoidal drive signal means connected to said four tiltable mirror assemblies for sinusoidally tilting said tiltable mirror assemblies to sinusoidally rotate said optical path.

2. A ring laser gyroscope with tilting mirrors as defined in claim 1 wherein a first of said four tiltable mirror assemblies comprises:

a mirror arrangement attached to said frame; and, a first path length control device attached to said mirror arrangement.

3. A ring laser gyroscope with tilting mirrors as defined in claim 2 wherein a second of said four tiltable mirror assemblies comprises:

a mirror arrangement attached to said frame; and, a second path length control device attached to said mirror arrangement.

4. A ring laser gyroscope with tilting mirrors as defined in claim 3 wherein a third of said four tiltable mirror assemblies comprises:

a mirror arrangement attached to said frame;

a prism attached to said mirror arrangement; and, a heterodyne detector connected to said prism.

5. A ring laser gyroscope with tilting mirrors as defined in claim 4 wherein a fourth of four tiltable mirror assemblies comprises:

a mirror arrangement attached to said frame;

a detector support structure connected to said mirror arrangement; and, intensity.detectors connected to said detector support structure.

6. A ring laser gyroscope with tilting mirrors as defined in claim 5 wherein said mirror arrangement comprises:

moated mirror means;

a support structure connected to said moated mirror means;

a center post connected to said moated mirror means; and, drive PZT means connected to said support structure and said center post for receiving said sinusoidal drive signal means.

7. A ring laser gyroscope with tilting mirrors as defined in claim 6 wherein said moated mirror means comprises:

a center section connected to said center post;

an outside section connected to said support structure;

thin moated webs separating said center section from said outside section and contacting said frame; and, an optical coating located at said center section on a surface of said moated mirror means adjacent to said frame.

8. A ring laser gyroscope with tilting mirrors as defined in claim 7 wherein said drive PZT means comprises:

a first PZT stretching across a first half of said moated mirror means from a center of said center post to a first outside edge of said support structure; and, a second PZT stretching across a second half of said moated mirror means from said center of said center post to a second outside edge of said support structure.

9. A ring laser gyroscope with tilting mirrors as defined in claim 8 wherein:

sinusoidal drive signal means causes length of said first PZT to increase while length of said second PZT decreases thereby applying force to said center post resulting in deformation of said thin moated webs and a tilting of said moated mirror means and said optical coating.

10. A ring laser gyroscope with tilting mirrors comprising:

a frame;

cathode and anode means mounted on said frame for producing counterpropagating waves traveling in opposite directions about an optical path within said frame;

a plurality of tiltable mirror assemblies mounted on said frame for defining said optical path;

path length control electronic means of maintaining a constant length of said optical path; and, sinusoidal drive signal means connected to said plurality of tiltable mirror assemblies for sinusoidally tilting said tiltable mirror assemblies to sinusoidally rotate said optical path.

11. A ring laser gyroscope with tilting mirrors as defined in claim 10 wherein each of said plurality of tiltable mirror assemblies comprises a mirror arrangement attached to said frame comprising:

moated mirror means;

a support structure connected to said moated mirror means;

a center post connected to said moated mirror means; and, drive PZT means connected to said support structure and said center post for receiving said sinusoidal drive signal means.

12. A ring laser gyroscope with tilting mirrors as defined in claim 11 wherein said moated mirror means comprises:

a center section connected to said center post;

an outside section connected to said support structure;

thin moated webs separating said center section from said outside section and contacting said frame; and, an optical coating located at said center section on a surface of said moated mirror means adjacent to said frame.

13. A ring laser gyroscope with tilting mirrors as defined in claim 12 wherein said drive PZT means comprises:

a first PZT stretching across a first half of said moated mirror means from a center of said center post to a first outside edge of said support structure; and, a second PZT stretching across a second half of said moated mirror means from said center of said center post to a second outside edge of said support structure.

14. A ring laser gyroscope with tilting mirrors as defined in claim 13 wherein:

sinusoidal drive signal means causes length of said first PZT to increase while length of said second PZT decreases thereby applying force to said center post resulting in deformation of said thin moated webs and a tilting of said moated mirror means and said optical coating.

* * * * *